United States Patent [19]

Maru

[11] Patent Number: 4,908,846
[45] Date of Patent: Mar. 13, 1990

[54] MOBILE TELEPHONE TERMINAL HAVING FUNCTION TO PERFORM CALL CLEAR PROCESS

[75] Inventor: Tsuguo Maru, Tokyo, Japan

[73] Assignee: NEC Corporation, Tokyo, Japan

[21] Appl. No.: 340,966

[22] Filed: Apr. 20, 1989

[30] Foreign Application Priority Data

Apr. 20, 1988 [JP] Japan ................................ 63-98728

[51] Int. Cl.⁴ .............................................. H04Q 7/01
[52] U.S. Cl. ...................................... 379/58; 379/61; 379/63; 455/127
[58] Field of Search ....................... 379/61, 62, 63, 58; 455/127, 343, 33, 34

[56] References Cited

U.S. PATENT DOCUMENTS

| | | | |
|---|---|---|---|
| 3,808,539 | 4/1974 | Martin | 455/127 |
| 3,962,553 | 6/1976 | Linder et al. | 379/61 |
| 3,980,996 | 9/1976 | Greenspan et al. | 455/127 |
| 4,513,446 | 4/1985 | Leslie | 455/73 |
| 4,544,924 | 10/1985 | French | 340/825.69 |
| 4,591,914 | 5/1986 | Hakamada et al. | 358/190 |
| 4,612,667 | 9/1986 | Hansen | 455/98 |
| 4,631,736 | 12/1986 | Yamanoue et al. | 375/71 |
| 4,691,338 | 9/1987 | Makino | 379/61 |
| 4,698,748 | 10/1987 | Juzswik et al. | 364/200 |

Primary Examiner—Robert Lev
Attorney, Agent, or Firm—Sughrue, Mion, Zinn, Macpeak & Seas

[57] ABSTRACT

A mobile telephone terminal includes a portable-unit and an adaptor which is capable of mounting the portable-unit on a vehicle and supplying power from a vehicle battery to the portable-unit. The adapter includes a power switch manually generating a switch signal and a delay circuit which delays the switch signal by a predetermined period of time when the telephone terminal is in a communication state and the power switch is depressed in place of a call end key. In response to the delayed switch signal, a transistor switch circuit stops power supply from the vehicle battery to the portable-unit. The portable-unit initiates a call clear process in response to the switch signal and during the predetermined period of time performs and completes the call clear process. In the call clear process, the portable-unit transmits a call clear signal to a base station over a radio channel used and turns off its radio frequency station. The call clear process makes the used radio channel available for other parties immediately after the call finishes.

24 Claims, 4 Drawing Sheets

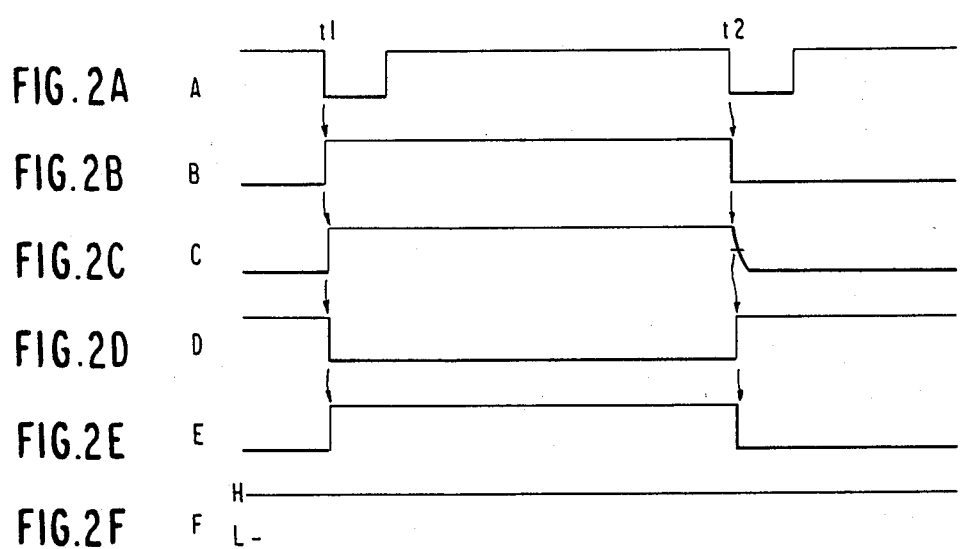
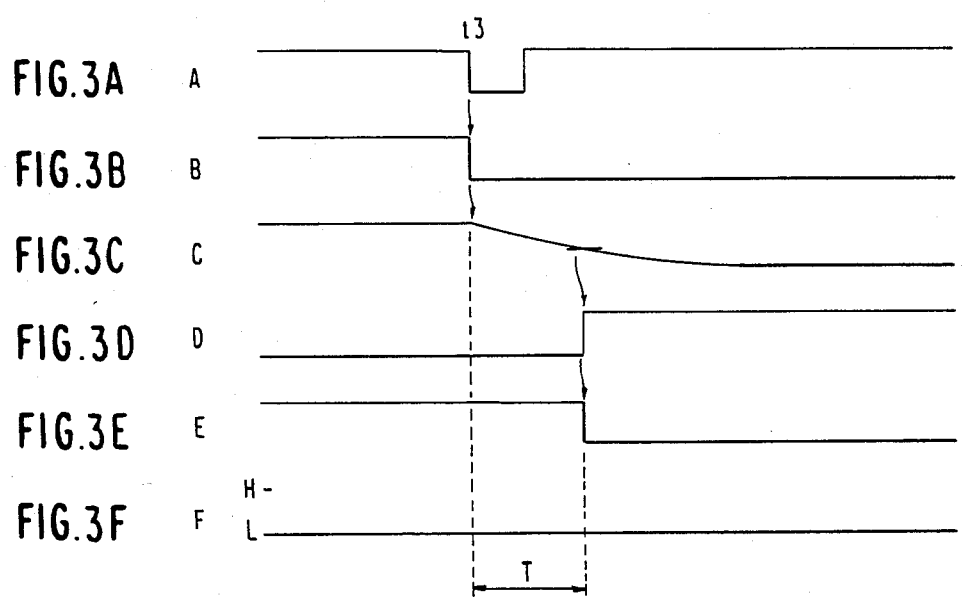

MOBILE TELEPHONE TERMINAL HAVING FUNCTION TO PERFORM CALL CLEAR PROCESS

BACKGROUND OF THE INVENTION

The present invention relates to a mobile telephone terminal for use in a mobile telephone system (MTS) and, more particularly, to a mobile telephone terminal having a function to perform a call clear process.

A mobile telephone terminal has an end key to end a conversation over a radio channel between a base station and the terminal. If the end key is depressed to end a conversation, the mobile telephone terminal performs a call clear process in which the terminal transmits a call clear signal to the base station and turns off its transmitter/receiver section. Upon reception of the call clear signal, the base station can immediately reassign the radio channel to other parties. But, if a power switch is depressed in place of the end key to end a conversation, the call clear signal is not transmitted to the base station. In this situation, since the base station which is monitoring the radio channel cannot determine whether or not the communication has finished, it must wait for a predetermined period of time. Only thereafter, the base station reassigns the radio channel to other parties. Thus, the radio channel cannot be assigned for the predetermined period of time even though the radio channel has already been available. This leads to the inefficient use of radio channels.

SUMMARY OF THE INVENTION

An object of the present invention is, therefore, to provide a generally improved mobile telephone terminal which eliminates the above-mentioned unefficient use of radio channels.

Another object of the present invention is to provide a mobile telephone terminal having a function to perform a call clear process in response to the actuation of a power switch.

Yet another object of the present invention is to provide a mobile telephone terminal which can turn itself off even if a controller, or a central processing unit, therein malfunctions.

Still another object of the present invention is to provide a mobile telephone terminal having a power switch indicator which correctly indicates a state of power supply thereto when a power switch is depressed in a waiting state.

Yet still another object of the present invention is to provide a mobile telephone terminal having an adapter which is used for mounting the terminal on a vehicle and for supplying power from a vehicle battery to the terminal and which can be turned off even if the terminal is removed therefrom.

According to the present invention, there is provided a mobile telephone terminal including a portable unit and an adapter which is capable of mounting the portable unit on a vehicle and supplying power from a vehicle battery to the portable unit. The adapter includes a power switch manually generating a switch signal and a delay circuit which delays the switch signal by a predetermined period of time when the telephone terminal is in a communication state and the power switch is depressed in place of a call end key. In response to the delayed switch signal, a transistor switch circuit stops power supply from the vehicle battery to the portable unit. The portable unit initiates a call clear process in response to the switch signal and during the predetermined period of time performs and completes the call clear process. In the call clear process, the portable unit transmits a call clear signal to a base station over a radio channel used and turns off its radio frequency section. The call clear process makes the used radio channel available for other parties immediately after the call finishes.

BRIEF DESCRIPTION OF THE DRAWINGS

The above and other objects, features and advantages of the present invention will become more apparent from the following description referring to the accompanying drawings in which:

FIGS. 2A to 2F and 3A to 3F are time charts showing the operation of the mobile telephone terminal shown in FIG. 1;

DETAILED DESCRIPTION OF THE PREFERRED EMBODIMENTS

Figure 1:
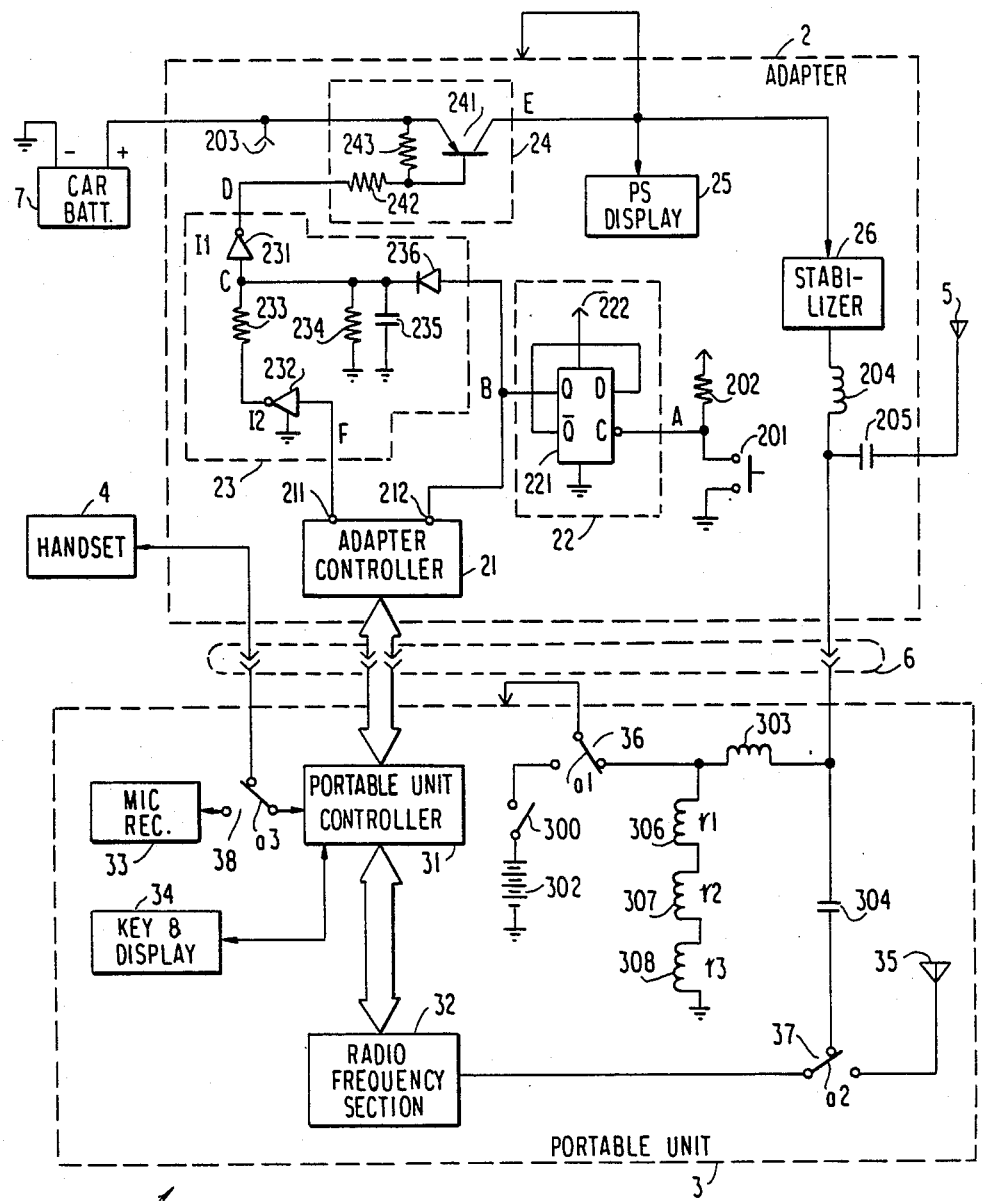
FIG. 1 is a block diagram showing a mobile telephone terminal in accordance with an embodiment of the present invention.

In FIG. 1, a mobile telephone terminal 1 includes an adapter 2, a portable unit 3, a handset 4, an antenna 5, a connector 6 and a vehicle battery 7. The antenna 5 is mounted on an outside of a vehicle. The battery 7 may have an output voltage of 13.8 volts. The adapter 2 comprises an adapter controller, or central processing unit, 21, a flip-flop (F/F) circuit 22, a delay circuit 23, a transistor switch circuit 24, a power switch display 25 and a voltage stabilizer 26. The stabilizer 26 changes the output voltage of battery 7 and may produce from a voltage of 13.8 volts a stabilized voltage of 7.2 volts.

The adapter 2 further comprises a power switch 201, a resistor 202, a terminal 203, a choke coil 204 and direct current (DC)-cut capacitor 205. The choke coil 204 is inserted to prevent a radio signal from reaching the stabilizer 26. The DC-cut capacitor 205 is inserted to prevent a DC signal from reaching the antenna 5. The power switch 201 may be composed of a push-button.

The F/F circuit 22 includes a D-type F/F 221 whose clock terminal C is supplied with an inverted signal of a signal A. A Q terminal of F/F 221 is connected with an input terminal 212 of controller 21. Data (D) and $\overline{Q}$ terminals are connected with each other. The F/F 221 is always energized through terminals 222 and 203. The power switch 201 is connected between one end of resistor 202 and ground. The other end of resistor 202 is connected with the terminal 203 to be supplied with power. The delay circuit 23 includes inverters (11 and 12) 231 and 232, the input of 232 being connected with an output terminal 211 of controller 21. The circuit 23 also includes a resistor 233 connected between the output of inverter 232 and the input of inverter 231. A resistor 234 is connected between the input of inverter 231 and ground. A capacitor 235 is connected in parallel with the resistor 234. The delay circuit 23 further includes a diode 236 whose anode and cathode are connected with the Q terminal of F/F 221 and the input of inverter 231, respectively.

When the input to inverter 232 is low, only the resistor 234 and capacitor 235 constitute a delay circuit. When the input to inverter 232 is high, the resistors 233 and 234 and capacitor 235 constitute another delay circuit whose time constant is so small that it is neglected compared with the time constant of the delay circuit made up of the resistor 234 and capacitor 235.

The transistor switch circuit 24 includes PNP transistor 241 whose emitter, collector and base are connected with the battery 7, the stabilizer 26 and one end of a resistor 242, respectively. The other end of resistor 242 is connected with the output of inverter 231. The switch circuit 24 also includes a resistor 243 connected between the emitter and base of transistor 241.

The portable unit 3 comprises a portable controller, or central processing unit, 31, a radio frequency (RF) section 32, a microphone/receiver 33, a key and display section 34, an antenna 35 and switches 36–38. The antenna 35 may be built in the portable unit 3. The RF section 32 may comprise a frequency modulation (FM) transmitter/receiver. The portable unit 3 further comprises a power switch 300, a built-in battery 302, a choke coil 303, a DC-cut capacitor 304 and relays 306–308. The choke coil 303 is inserted to prevent a radio signal from reaching the switch 36 and relays 306–308. The capacitor 304 is inserted to prevent a DC signal from reaching the switch 37.

When the portable unit 3 is mounted on the adapter 2, the armatures a1–a3 of relays 306–308 are connected with the choke coil 303, capacitor 304 and handset 4, respectively. On the other hand, when the unit 3 is demounted from the adapter 2, the armatures a1–a3 are connected with the switch 300, antenna 35 and microphone/receiver 33, respectively.

The controller 31 is connectable with the adapter controller 21 through the connector 6. The controller 31 is connected with the RF section 32 which in turn is connected with the antenna 5 or 35. The key and display section 34 is also connected with the controller 31. One of handset 4 and microphone/receiver 33 is connected with the controller 31 through the switch 38.

In operation, when the portable unit 3 is demounted from the adapter 2, communication between the mobile telephone terminal and a base station (not shown) can be performed through the antenna 35 and microphone/receiver 33. In this case, power is supplied from the built-in battery 302 to the portable unit 3. On the other hand, when the portable unit 3 is mounted on the adapter 2, the communication can be performed through the antenna 5 and the handset 4. In this case, power is supplied from the vehicle battery 7 to both the adapter 2 and the portable unit 3.

If an end key (not shown) within the key and display 34 is depressed to end communication, the controller 31 performs a call clear process in which the controller 31 transmit a call clear signal to the base station and turns off the a powr amplifier (not shown) in RF section 32.

Assuming that the portable unit 3 is mounted on the adapter 2. In a waiting state, the portable-unit controller 31 sends a waiting state signal to the adapter controller 21. In response, the adapter controller 21 produces a high-level signal F (see FIG. 2F) at the terminal 211 and thus the delay circuit 23 has a very small time constant. In this condition, if the power switch 201 is depressed at time t1 shown in FIG. 2A, a signal A becomes low causing the F/F circuit 22 to output a high-level signal B, as shown in FIG. 2B. The high-level signal B passes through the diode 236 and appears at the input of inverter 231 with no delay as shown in FIG. 2C. In response to the high-level signal C, the inverter 231 produces a low-level signal D, as shown in FIG. 2D, which renders the transistor 241 operative to supply power to both the adapter 1 and the portable unit 3.

If the power switch 201 is depressed once again at time t2 as shown in FIG. 2A, the signal B is inverted to a low-level as shown in FIG. 2B. Thus, the signal C becomes low with substantially no delay (see FIG. 2C), because the delay circuit 23 has a very small time constant in the waiting state. Upon the low-level signal C, the inverter 231 produces a high-level signal D, as shown in FIG. 2D, which renders the transistor 241 inoperative to stop power supply to the adapter 2 and the portable unit 3.

In the waiting state, therefore, stopping the power supply can be conducted with substantially no delay in response to the depression of power switch 201. Since the power supply display 25 displays thereon a signal indicating the output state of transistor switch circuit 24, the user can definitely confirm the state of the power supply.

In a communication, or conversation, state, the portable-unit controller 31 sends a conversation state signal to the adapter controller 21. In response, the adapter controller 21 produces a low-level signal F (see FIG. 3F) at the terminal 211 and thus the delay circuit 23 has a relatively longer time constant. In this condition, if the power switch 201 is depressed at time t3 (see FIG. 3A) to end the communication without depression of the end key, the signal A becomes low causing the F/F circuit 22 to output a low-level signal B, as shown in FIG. 3B. The low-level signal B is delayed at the delay circuit 23 by a predetermined period of time (T) (see FIGS. 3C and 3D). After the time period T, the transistor 241 is turned off by the signal D, as shown in FIG. 3E, to stop power supply to the adapter 2 and the portable unit 3.

When the power switch 2001 is depressed during the communication, the low-level signal B is also applied to the terminal 212 of controller 21. In response to this signal B, the controller 21 supplies to the portable-unit controller 31 a call clear command indicating that the call clear process is to be executed. Upon reception of the call clear command, the controller 31 conducts the call clear process.

The time period T is determined to be sufficient to allow the portable-unit controller 31 to perform and complete the call clear process. For example, the time period of 2 seconds can be set by selecting the resistances of resistors 233 and 234 to be 10 and 680 Kohms, respectively, and the capacitance of capacitor 235 to be 33 microfarads. This selection causes 30 milliseconds delay in the waiting state.

Even if the power switch 201 is depressed during a communication, the call clear process is carried out. Accordingly, the inefficient use of radio channels can be eliminated. Furthermore, since the delay time T for the call clear process is given by the delay circuit 23, the power supply can be definitely stopped even if the controller 21 or 31 malfunctions.

Figure 4:
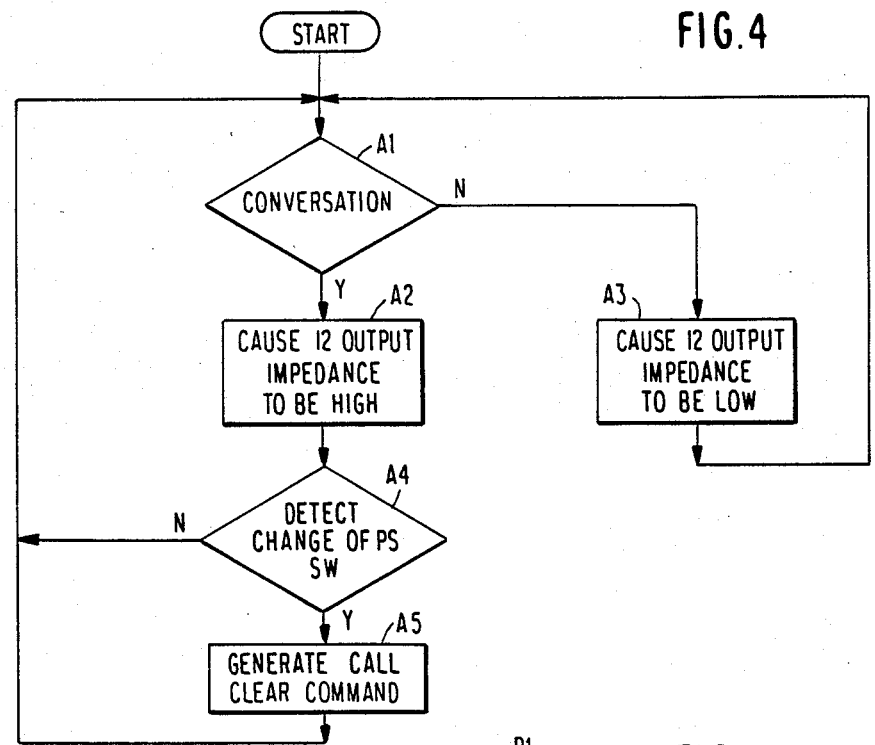
FIGS. 4 and 5 are flow charts respectively showing the operations of the adapter and portable-unit controllers in the telephone terminal of FIG. 1.

Referring to FIG. 4, the operation of the adapter controller 21 will now be described. At step A1, the controller 21 decides based on the signal from the portable-unit controller 31 whether the state of the telephone terminal 1 is in a waiting or communication state. If the state is the waiting one, the operation moves to step A3 to produce at the terminal 211 a high-level signal which causes the output impedance of the inverter 12 to be low. If the state is the communication one, step A2 is executed to produce at the terminal 211 a low-level signal which causes the output impedance of the inverter 12 to be high. Step A2 is followed by step A4 at which the status of the power switch 201 as checked by seeing the signal level at the terminal 212. If no change occurs, the program returns to step A1. If the status changes, the controller 21 generates a call clear command and supplies it to the portable-unit controller 31 at step A5. Steps A4 and A5 return to step A1.

Figure 5:
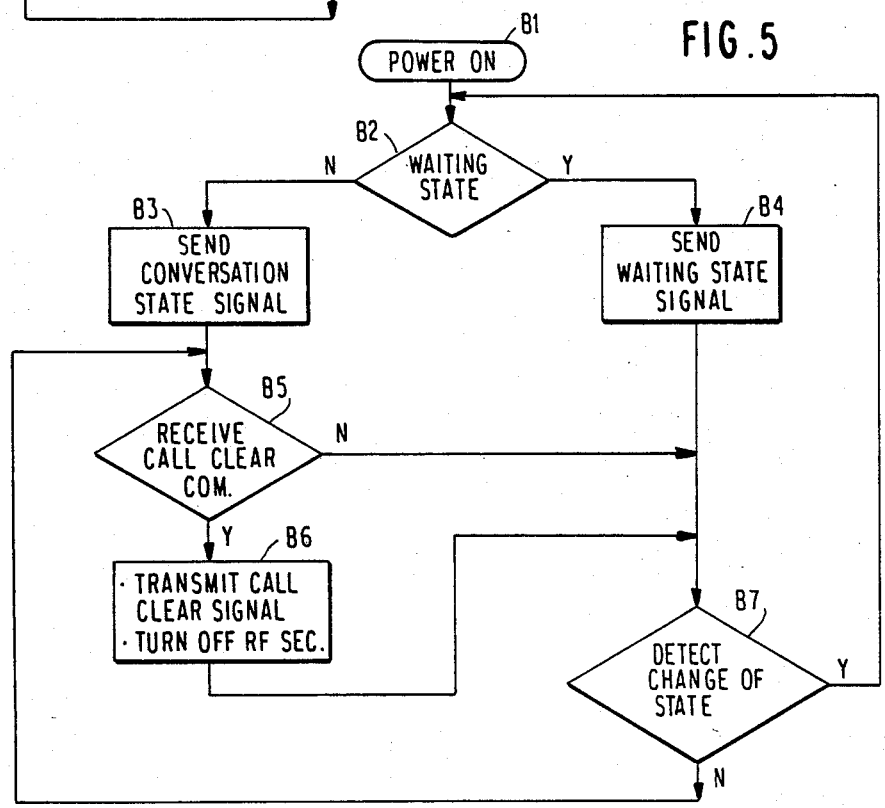

Referring to FIG. 5, the operation of the portable-unit controller 31 will be described below. After power as turned on as step B1, the controller 31 checks at step B2 whether the telephone terminal 1 is in a waiting or communication state. If in the waiting state, the controller 31 sends a waiting state signal to the adapter controller 21 at step B4. If in the communication, or conversation, state, the controller 21 sends a conversation state signal at step B3. After sending the conversation state signal, the controller 31 sees at step B5 if it receives a call clear command from the controller 21. If receiving the command, the controller 31 performs at step B6 the call clear process, i.e., transmits a call clear signal to the base station and turns off the RF section 32.

If no command is received at step B5, the operation goes to step B7 which also follows steps B4 and B6. At step B7, the controller 31 checks whether or not the state of the telephone terminal 1 is changed, viz., the waiting state is changed to the communication state or vice-versa. If the state changes, the operation returns to step B2, if not, step B7 is followed by step B5.

Returning to FIG. 1, when the portable unit 3 is removed from the adapter 2, communication may be stopped by the power switch 300 in place of the call end key. If the controller 31 is programmed to execute the same function as the delay circuit 23, the inefficient use of radio channels may be avoided. If the controller 31 malfunctions, however, power supply cannot be stopped. To avoid this problem, the portable unit 3 may be modified to a circuit shown in FIG. 6.

Figure 6:
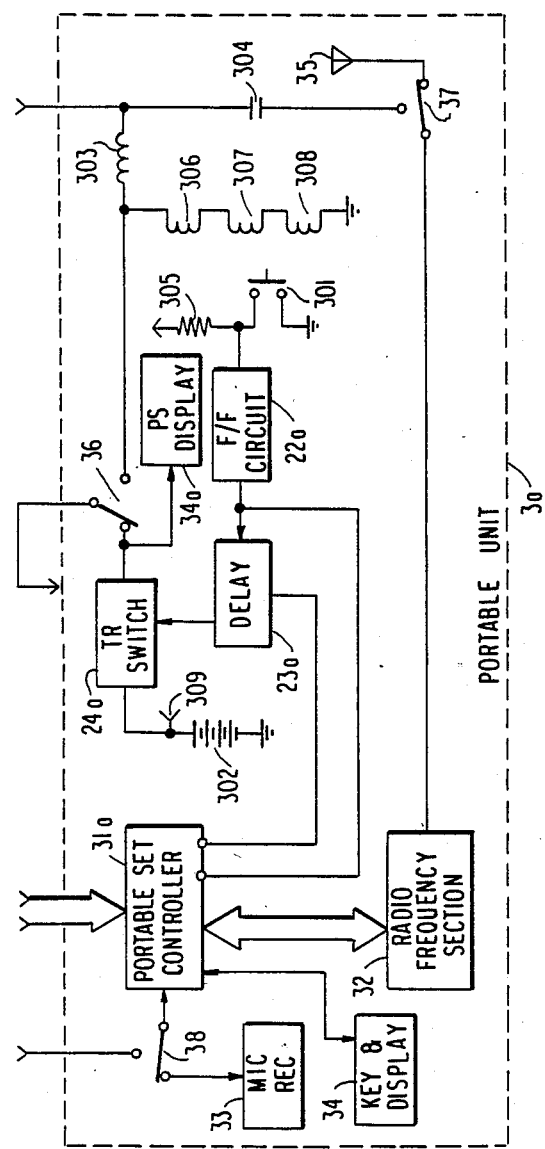
FIG. 6 is a block diagram showing a modification of the FIG. 1 terminal in accordance with the present invention.

In FIG. 6, a portable unit 3a includes an F/F circuit 22a, a delay circuit 23a and a transistor switch circuit 24a which are the same structure and function as those of the F/F circuit 22, the delay circuit 23 and the transistor switch 301. A switch 301, resistor 305, a terminal 309 and a PS display 34a correspond to the switch 201, the resistor 202, the terminal 203 and the PS display 25 of FIG. 1, respectively.

The controller 31a executes substantially the same program as that shown in FIG. 5. At steps B3 and B4, the controller 31a sends a state signal (high- or low-level signal) to the delay circuit 23a but not to the controller 21. Also, the controller 31a checks at step B5 whether a signal indicating the status of power switch 301 but not the call clear command is received or not. With the modification of FIG. 6, power supply to the portable unit can be definitely stopped even if the controller 31a malfunctions.

It should be noted in FIG. 1 that even when the portable unit 3 is removed from the adapter 2 and the adapter controller 21 malfunctions, the adapter 2 can be definitely turned off by the combination of the F/F circuit 22, delay circuit 23 and transistor switch circuit 24.

What is claimed is:
1. A mobile telephone terminal comprising:
vehicle battery means mounted on a mobile support;
portable unit means for radio communicating with a base station;
adapter means connected between said battery means and said portable unit means for fixing said portable unit means to said mobile support and for supplying power from said battery means to said portable unit means;
means for generating a waiting state signal when said telephone terminal is in a waiting state;
means for generating a communication state signal when said telephone terminal is in a communication state;
power switch means for manually generating a switch signal;
delay circuit means for delaying said switch signal by a first predetermined period of time in response to said waiting state signal to produce a first delay signal and for delaying said switch signal by a second predetermined period of time in response to said communication state signal to produce a second delay signal, said first predetermined period of time being shorter than said second predetermined period of time;
power supply switch means responsive to one of said first and second delay signals for stopping power supply from said battery to said portable unit; and
call clear means responsive to said switch signal for performing a call clear process, said second predetermined period of time being long enough to allow said call clear means to complete said call clear process.

2. A mobile telephone terminal as claimed in claim 1 further comprising power supply display means for displaying the output state of said power supply switch means.

3. A mobile telephone terminal as claimed in claim 1, wherein said power switch means comprises: a resistor one end of which is connected with said battery means; a push-button switch connected between the other end of said resistor and ground; and a flop-flop whose clock terminal is connected with said other end, whose $\overline{Q}$ and D terminals are connected with each other and whose Q terminal is connected with the output of said power switch means, said flop-flop being energized by said battery means.

4. A mobile telephone terminal as claimed in claim 1, wherein said delay circuit means comprises: a diode whose cathode is connected with the output of said power switch means; a capacitor connected between the cathode of said diode and ground; a first resistor connected between said cathode and ground; a second resistor one end of which is connected with said cathode; a first inverter whose input and output are connected with said cathode and with the output of said delay circuit means, respectively; and a second inverter whose input is supplied with said waiting and communication state signals and whose output is connected with the other end of said second resistor.

5. A mobile telephone terminal as claimed in claim 4, wherein the resistance of said first resistor is 10 Kohms, the resistance of said second resistor is 680 Kohms and the capacitance of said capacitor is 3.3 microfarads.

6. A mobile telephone terminal as claimed in claim 1, wherein said power supply switch means comprises: a transistor whose emitter and collector are connected with said battery means and the output of said power supply switch means, respectively; a first resistor connected between the output of said delay circuit means and the base of said transistor; and a second resistor connected between said emitter and base.

7. A mobile telephone terminal as claimed in claim 6, wherein said transistor comprises a PNP transistor.

8. A mobile telephone terminal comprising:
first means for generating a first control signal when said telephone terminal is in a communication state;
second means for generating a second control signal when said telephone terminal is not in said communication state;
power switch means;
third means for detecting the actuation of said power switch means when said telephone terminal is in said communication state to produce a third control signal;
fourth means responsive to said third control signal for performing a call clear process;
fifth means responsive to said second control signal for stopping power supply to said telephone terminal immediately after said fifth means receives said third control signal; and
sixth means responsive to said first control signal for stopping said power supply after a predetermined period of time from the time when said sixth means receives said third control signal, said predetermined period of time being long enough to allow said fourth means to complete said call clear process.

9. A mobile telephone terminal as claimed in claim 1, wherein said mobile support is a vehicle and said battery means is a vehicle battery.

10. A telephone terminal comprising:
radio communication means for radio communicating with other parties;
battery means for supplying power to said telephone terminal;
power switch means for generating a switch signal;
call clear means responsive to said switch signal for performing a call clear process;
means for generating a communication state signal when said telephone terminal is in a communication state;
means for generating a waiting state signal when said telephone terminal is not in a communication state;
delay circuit means for delaying said switch signal by a first predetermined period of time in response to said communication state signal to produce a first control signal and for delaying said switch signal by a second predetermined period of time in response to said waiting state signal to produce a second control signal, said first predetermined period of time being longer than said second predetermined period of time and being long enough to allow said call clear means to complete said call clear process; and
power supply switch means responsive to one of said first and second control signals for stopping power supply from said battery means to said telephone terminal.

11. A telephone terminal as claimed in claim 10, wherein said second predetermined period of time is substantially zero.

12. A telephone terminal as claimed in claim 10 further comprising display means for displaying the output state of said power supply switch means.

13. A telephone terminal as claimed in claim 10, wherein said radio communication means comprises antenna means for picking up a radio signal and radiating a modulated radio signal; and frequency modulator/demodulator means for modulating a radio frequency signal with an inputted audio signal to produce said modulated radio signal and for demodulating the picked-up radio signal to produce a demodulated radio signal, and wherein said telephone terminal further comprises microphone/receiver means for outputting said demodulating audio signal and for inputting an audio signal to produce said inputted audio signal.

14. A telephone terminal as claimed in claim 10, wherein said call clear means comprises means for transmitting a call clear signal to a base station and means for turning off said radio communication means.

15. A telephone terminal as claimed in claim 10, wherein said delay circuit means comprises:
a diode whose cathode is connected with the output of said power switch means;
a capacitor connected between the cathode of said diode and ground;
a first resistor connected between said cathode and ground;
a second resistor one end of which is connected with said cathode;
a first inverter whose input and output are connected with said cathode and with the output of said delay circuit means, respectively; and
a second inverter whose input is supplied with said waiting and communication state signals and whose output is connected with the other end of said second resistor.

16. In a combination of portable unit means, adapter means for mounting said portable unit means on a vehicle, vehicle battery means for applying power to said adapter means and said portable unit means, handset means and first antenna means mounted on said vehicle.
said portable unit means comprising:
radio frequency (RF) section means;
second antenna means built in said portable unit means and being connectable with said RF section means;
portable-unit controller means connected with said RF section means and including means for generating a waiting state signal when said portable unit means is in a waiting state, call clear means for generating a communication state signal when said portable unit means is in a communication state, and means responsive to a call clear command for performing a call clear process;
microphone/receiver means connected with said portable-unit controller means; and
portable-unit battery means for supplying power to said portable unit means.
said adapter means comprising:
adapter controller means including means for generating a first control signal in response to said communication state signal, means for generating a second control signal in response to said waiting state signal, and means for generating said call clear command in response to a switch signal;
power switch means for manually generating said switch signal;
delay circuit means for delaying said switch signal by a first and a second predetermined period of time in response to said first and said second control signal, respectively, to produce a first and a second power control signal, respectively, said first predetermined period of time being longer than said second predetermined period of time and being long enough to allow said call clear means to complete said call clear process; and power supply switch means responsive to one of said first and second power control signals for stopping power supply from said vehicle battery means to said adapter means and said portable unit means;

said combination further comprising:

first switch means connected between said portable-unit battery means and said vehicle battery means;

second switch means connected between said first and second switch means;

third switch means connected between said microphone/receiver and handset means; and switch control means for connecting said first, second and third switch means with said vehicle battery means, said first antenna means and said handset means, respectively, in response to the attachment of said portable unit means to said adapter means and for connecting said first, second and third switch means with said portable-unit battery means, said second antenna means and said microphone/receiver means, respectively, in response to the detachment of said portable-unit means from said adapter means.

17. A combination as claimed in claim 16, wherein said adapter means further comprises stabilizer means for voltage stabilizing the output voltage of said vehicle battery means to supply a stabilized voltage to said portable unit means.

18. A combination as claimed in claim 17, wherein said vehicle battery means has substantially a 13.8-volt output and said stabilizer means has substantially a 7.2-volt output.

19. A combination as claimed in claim 16, wherein said switch control means comprises relays energized by said vehicle battery mean.

20. A combination as claimed in claim 16, wherein said call clear means comprises means for transmitting a call clear signal to a base station and means for turning off said RF section means.

21. A method of controlling power supply to a telephone terminal, comprising the following steps of:

supplying power to said telephone terminal;

generating a switch signal;

responsive to said switch signal performing a call clear process;

generating a communication state signal when said telephone terminal is in a communication state;

generating a waiting state signal when said telephone terminal is in a waiting state;

responsive to said communication state signal, delaying said switch signal by a first predetermined period of time to produce a first control signal;

responsive to said waiting state signal, delaying said switch signal by a second predetermined period of time to produce a second control signal, said first predetermined period of time being longer than said second predetermined period of time and being enough to complete said step of performing said call clear process; and responsive to one of said first and second control signals, stopping power supply to said telephone terminal.

22. A method as claimed in claim 21, further comprising the step of indicating the status of the power supply to said telephone terminal.

23. A method as claimed in claim 21, further comprising the step of stabilizing the voltage of power supply to said telephone terminal.

24. A method as claimed in claim 21, wherein said step of performing said call clear process comprises: transmitting a call clear signal; and turning off said telephone terminal.

* * * * *

UNITED STATES PATENT AND TRADEMARK OFFICE
CERTIFICATE OF CORRECTION

PATENT NO. : 4,908,846
DATED : March 13, 1990
INVENTOR(S) : Tsuguo MARU

It is certified that error appears in the above-identified patent and that said Letters Patent is hereby corrected as shown below:

Col. 2, lines 58 and 59, delete "(11 and 12)" and insert --(I1 and I2)--.

Col. 3, line 57, delete "powr" and insert --power--.

Col. 4, line 5, delete "adapter 1" and insert --adapter 2--;

line 39, delete "2001" and insert --201--.

Col. 5, line 1, delete "12" and insert --I2--.

Col. 9, line 38, delete "mean" and insert --means--.

Signed and Sealed this

Seventh Day of May, 1991

Attest:

HARRY F. MANBECK, JR.

*Attesting Officer*  *Commissioner of Patents and Trademarks*